United States Patent
Khosrowpour et al.

(10) Patent No.: US 11,967,155 B2
(45) Date of Patent: Apr. 23, 2024

(54) SYSTEMS AND METHODS FOR IMPROVING ACCURACY OF IDENTIFYING OBSERVATIONS BASED ON IMAGES AND RISK ASSESSMENT TECHNIQUES USING SUCH DETERMINATIONS

(71) Applicant: OnSiteIQ Inc., New York, NY (US)

(72) Inventors: Ardalan Khosrowpour, New York, NY (US); Kishan Sudusinghe, Jersey City, NJ (US)

(73) Assignee: ONSITEIQ INC., New York, NY (US)

( * ) Notice: Subject to any disclaimer, the term of this patent is extended or adjusted under 35 U.S.C. 154(b) by 424 days.

(21) Appl. No.: 17/503,838

(22) Filed: Oct. 18, 2021

(65) Prior Publication Data

US 2022/0121858 A1    Apr. 21, 2022

Related U.S. Application Data

(60) Provisional application No. 63/093,470, filed on Oct. 19, 2020.

(51) Int. Cl.
*G06K 9/00*    (2022.01)
*G06F 18/2431*    (2023.01)
(Continued)

(52) U.S. Cl.
CPC .......... *G06V 20/52* (2022.01); *G06F 18/2431* (2023.01); *G06Q 10/06313* (2013.01); *G06Q 40/08* (2013.01)

(58) Field of Classification Search
CPC ...... G06V 20/176; G06V 20/20; G06V 20/52; G06V 20/17; G06V 20/00; G06V 20/10;
(Continued)

(56) References Cited

U.S. PATENT DOCUMENTS

| | | | |
|---|---|---|---|
| 9,934,335 B2 | 4/2018 | Pettersson | |
| 10,339,384 B2 | 7/2019 | Lorenzo | |

(Continued)

FOREIGN PATENT DOCUMENTS

| | | | |
|---|---|---|---|
| CN | 108647753 A | 10/2018 | |
| CN | 111191870 A | 5/2020 | |

(Continued)

OTHER PUBLICATIONS

International Search Report and Written Opinion of International Searching Authority for PCT/US2021/059577, ISA/RU, Moscow, Russia, dated Dec. 6, 2021.
(Continued)

*Primary Examiner* — Alex Kok S Liew
(74) *Attorney, Agent, or Firm* — M&B IP Analysts, LLC

(57) ABSTRACT

A system and method for identifying observations using images of a construction site. A method includes identifying observations in visual media content by identifying items shown in the visual media content, wherein each identified observation corresponds to at least one item of the identified items, wherein each observation corresponds to a type; determining a likelihood impact parameter for each of the observations by applying likelihood rules based on a classification of each of the corresponding at least one item and a ratio of historical incidents of the same type as the observation to a total number of projects in a time period; determining a severity impact parameter for each of the observations by applying severity rules based on an average cost of the historical incidents of the same type as the observation; and determining at least one risk factor for each observation based on its likelihood and severity impact parameters.

19 Claims, 6 Drawing Sheets

(51) Int. Cl.
*G06Q 10/0631* (2023.01)
*G06Q 40/08* (2012.01)
*G06V 20/52* (2022.01)

(58) Field of Classification Search
CPC ...... G06V 10/10; G06V 20/13; G06V 10/751;
G06V 10/235; G06V 10/764; G06V
20/58; G06V 10/225; G06V 10/82; G06V
20/64; G06V 10/44; G06V 10/768; G06V
10/993; G06V 10/774; G06V 10/761;
G06V 20/35; G06V 20/188; G06V 20/39;
G06V 20/593; G06V 2201/10; G06Q
50/08; G06Q 10/06311; G06Q 40/03;
G06Q 40/08; G06Q 40/12; G06Q 50/163;
G06Q 10/063114; G06Q 10/0635; G06Q
30/0278; G06T 7/0004; G06T
2207/10032; G06T 2207/30184; G06T
2200/24; G06T 7/001; G06T 2207/30132;
G06T 2207/20092; G06T 2207/30242;
G06T 7/70; G06T 7/0006; G06T 7/30;
G06T 7/38

See application file for complete search history.

(56) References Cited

U.S. PATENT DOCUMENTS

| | | | |
|---|---|---|---|
| 10,467,758 | B1 | 11/2019 | Lorenzo |
| 2012/0306664 | A1* | 12/2012 | Geter ................ G08G 1/166 340/903 |
| 2016/0343140 | A1 | 11/2016 | Ciprari et al. |
| 2017/0276485 | A1 | 9/2017 | Pettersson et al. |
| 2018/0053130 | A1 | 2/2018 | Pettersson et al. |
| 2018/0349817 | A1* | 12/2018 | Goel ................ G06F 30/13 |
| 2019/0156427 | A1 | 5/2019 | Emison |
| 2019/0180433 | A1* | 6/2019 | Sasson ............ G06V 20/176 |
| 2019/0325089 | A1 | 10/2019 | Golparvar-Fard et al. |
| 2020/0065971 | A1 | 2/2020 | Lorenzo |
| 2020/0258163 | A1 | 8/2020 | Dalal et al. |
| 2021/0183080 | A1 | 6/2021 | Hoiem et al. |
| 2021/0272372 | A1 | 9/2021 | Heinen et al. |

FOREIGN PATENT DOCUMENTS

| | | |
|---|---|---|
| CN | 107220786 B | 1/2021 |
| CN | 108647753 B | 3/2021 |
| CN | 112862273 A | 5/2021 |
| KR | 101907964 B1 | 10/2018 |
| KR | 101951119 B1 | 2/2019 |
| KR | 102076413 B1 | 3/2020 |
| KR | 102219207 B1 | 2/2021 |
| WO | 2020191004 A1 | 9/2020 |

OTHER PUBLICATIONS

Internation Preliminary Report on Patentability for PCT/IB2021/059577, dated Apr. 13, 2023. International Bureau of WIPO.

* cited by examiner

SYSTEMS AND METHODS FOR IMPROVING ACCURACY OF IDENTIFYING OBSERVATIONS BASED ON IMAGES AND RISK ASSESSMENT TECHNIQUES USING SUCH DETERMINATIONS

CROSS-REFERENCE TO RELATED APPLICATIONS

This application claims the benefit of U.S. Provisional Application No. 63/093,470 filed on Oct. 19, 2020, the contents of which are hereby incorporated by reference.

TECHNICAL FIELD

The present disclosure relates generally to image-based analysis of construction sites, and more specifically to rules-based identification of observations related to construction sites and uses thereof.

BACKGROUND

During the planning phase for a construction site project, progress is defined via tasks and milestones as well as planned timing for such tasks and milestones. A schedule is planned based on completion of tasks. The project is conducted assuming that specific milestones are met before proceeding to subsequent phases.

Risk assessment for construction projects relies on identifying issues which will result in additional delays, costs, and/or damage to property, or which may result in harm to personnel. For risk assessment purposes, delays may have a cascading effect in which a delay caused by failure to complete one task on time may cause further delays due to scheduling conflicts with other tasks. Often, tasks are scheduled assuming that one task will be completed before the other that some tasks cannot be completed at the same time. For example, the rough-in phase of a construction is scheduled such that it does not overlap with closing the walls or installing drywall since these subsequent tasks would interfere with installing rough framing, piping, and wiring.

Accordingly, risk assessment uses these potential issues in order to determine the likelihood and severity of the identified issues. Therefore, identifying these issues during a construction project is necessary in order to accurately assess and adapt to emerging risks. Some existing solutions provide images of the construction site to a supervisor or other human monitor, and the human monitor points out any issues they see in the images. However, these solutions are subject to bias and human error that can cause subsequent risk assessments to be inaccurate and inconsistent.

More specifically, aspects of identifying issues manually include visually identifying the potential issue-causing portions of images as well as determining whether each potential issue is significant enough to warrant risk assessment. These aspects are subject to human error and leave room for subjective assessments of "significance." The result is that different human monitors may identify different issues for the same images even when the human monitors are using the same guidelines (e.g., definitions of what constitute issues). Further, human monitors subjectively evaluating potential risks of construction sites may arrive at different conclusions regarding potential impacts of issues depending on personal biases. As a result, the evaluation of any identified observations may be inaccurate and inconsistent.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for determining impact parameters for observations identified in visual media content. The method comprises: identifying a plurality of observations in visual media content, wherein identifying the plurality of observations further comprises identifying a plurality of items shown in the visual media content, wherein each identified observation corresponds to at least one item of the identified plurality of items, wherein each observation corresponds to a respective incident type; determining a likelihood impact parameter for each of the plurality of observations, wherein determining the likelihood impact parameter for each observation further comprises applying likelihood rules based on a classification of each of the corresponding at least one item and a ratio of historical incidents of a same incident type as the observation to a total number of projects in a time period; determining a severity impact parameter for each of the plurality of observations, wherein determining the severity impact parameter for each observation further comprises applying severity rules based on an average cost of the historical incidents of the same incident type as the observation; and determining at least one risk factor for each of the plurality of observations based on the likelihood and severity impact parameters determined for the observation.

Certain embodiments disclosed herein also include a non-transitory computer readable medium having stored thereon causing a processing circuitry to execute a process, the process comprising: identifying a plurality of observations in visual media content, wherein identifying the plurality of observations further comprises identifying a plurality of items shown in the visual media content, wherein each identified observation corresponds to at least one item of the identified plurality of items, wherein each observation corresponds to a respective incident type; determining a likelihood impact parameter for each of the plurality of observations, wherein determining the likelihood impact parameter for each observation further comprises applying likelihood rules based on a classification of each of the corresponding at least one item and a ratio of historical incidents of a same incident type as the observation to a total number of projects in a time period; determining a severity impact parameter for each of the plurality of observations, wherein determining the severity impact parameter for each observation further comprises applying severity rules based on an average cost of the historical incidents of the same incident type as the observation; and determining at least one risk factor for each of the plurality of observations based on the likelihood and severity impact parameters determined for the observation.

Certain embodiments disclosed herein also include a system for determining impact parameters for observations identified in visual media content. The system comprises: a processing circuitry; and a memory, the memory containing instructions that, when executed by the processing circuitry, configure the system to: identify a plurality of observations in visual media content, wherein identifying the plurality of observations further comprises identifying a plurality of items shown in the visual media content, wherein each identified observation corresponds to at least one item of the identified plurality of items, wherein each observation corresponds to a respective incident type; determine a likelihood impact parameter for each of the plurality of observations, wherein determining the likelihood impact parameter for each observation further comprises applying likelihood rules based on a classification of each of the corresponding at least one item and a ratio of historical incidents of a same incident type as the observation to a total number of projects in a time period; determine a severity impact parameter for each of the plurality of observations, wherein determining the severity impact parameter for each observation further comprises applying severity rules based on an average cost of the historical incidents of the same incident type as the observation; and determine at least one risk factor for each of the plurality of observations based on the likelihood and severity impact parameters determined for the observation.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
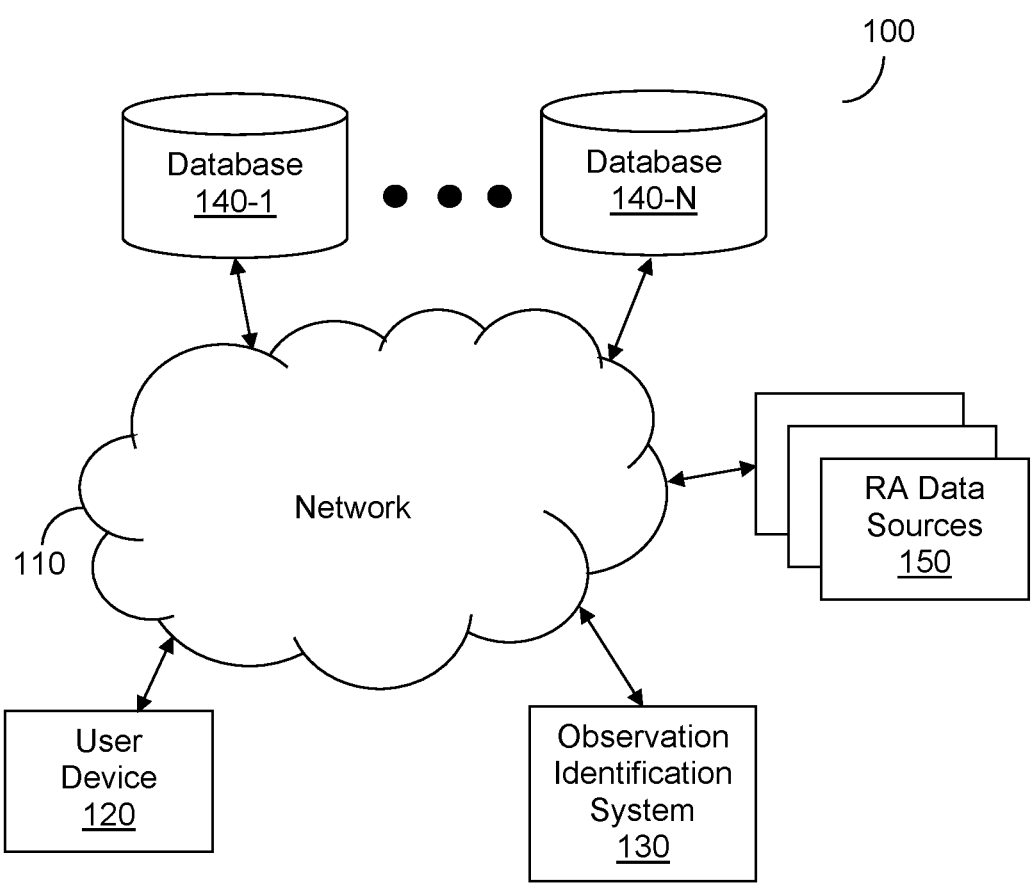
FIG. 1 is a network diagram utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include methods and systems for identifying observations using images of a construction site and techniques for using such observations. The observations relate to the state of a construction site and are identified based on analysis of visual media content showing a construction site.

Visual media content showing a construction site is obtained. Based on the visual media content, one or more observations is identified. Each observation is related to an issue that may impact risk assessment for the construction site. The observations may be identified using a machine learning model trained to classify items shown in the visual media content, and may be further based on relationships between items such as spatial relationships.

An impact of each observation is determined. The impact may be defined as one or more impact parameters. Based on the impact and a type of each observation, a risk exposure is determined. Types of observations that are identified and impact parameters used to measure may vary depending on use requirements.

In an embodiment, the identified observations relate to issues which impact the safety of a construction site and, therefore, could impact risk, for example, for insurance purposes. To this end, in such an embodiment, the identified observations include such safety observations, and the impact parameters used to express the impact of the safety observations include likelihood of danger and severity of harm. Based on the likelihood and severity impact parameters, risk factors are determined. An average claim cost for similar issues is identified in a database of historical claim costs. Based on the average claim cost, a risk exposure is determined. For safety, the risk exposure may be a projected average cost of allowing the safety issue to remain uncorrected. Such risk exposure may be subsequently utilized, for example, in order to adjust an insurance rate in relation to the construction project. In other embodiments, other types of observations may be identified and utilized.

Each of the observations relates to an issue with the construction site that can be visually identified and could affect the construction project such as, but not limited to, safety hazards, quality control, incomplete progress, budgetary concerns, or a combination thereof. Each of these issues may impede progress or result in harm to workers or bystanders, thereby causing delays, increasing costs, or both. In an embodiment, the impact of each issue on the risk of a construction project may be expressed as two parameters: likelihood and severity. These factors, combined with historical data for costs of issues having various likelihoods and severities, may be utilized to estimate financial risk. Accordingly, objectively and accurately identifying observations in visual media content showing a construction site as described herein allows for more accurately estimating such risks.

More specifically, the disclosed embodiments may be utilized in order to provide relevant data to insurance adjusters in order to assess the risks on a construction site. Due to the use of objective rules and machine learning as discussed herein, the observations are more accurate and less subjective than manual observations, and may be provided in an automated fashion, thereby allowing for adjusting risk exposure evaluations without requiring sending an insurance adjuster to the construction site or requiring manual viewing of hours of video footage or hundreds to thousands of images. Accordingly, among other uses, the observations provided as described herein may be utilized to substantially improve the efficiency of risk assessment by insurance carriers.

The disclosed embodiments utilize a rules-based approach to identifying observations in visual media content that provides objective identifications of observations which results in more accurate and consistent observations as opposed to existing manual solutions, which introduce subjectivity into the identifications of observations. Further, the disclosed embodiments include a rules-based approach for determining the impact of observations, thereby improving the accuracy and objectivity of such impact determinations. The disclosed embodiments also include techniques for improving machine learning models using confidence scores that provide improved accuracy of identifying observations by ignoring redundant observations related to the same item appearing in multiple portions of visual content.

FIG. 1 shows an example network diagram 100 utilized to describe the various disclosed embodiments. In the example network diagram 100, a user device 120, an observation identification system 130, a plurality of databases 140-1 through 140-N (hereinafter referred to individually as a database 140 and collectively as databases 140, merely for simplicity purposes), and regulatory authority (RA) data sources 150 are communicate via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

The user device (UD) 120 may be, but is not limited to, a personal computer, a laptop, a tablet computer, a smartphone, a wearable computing device, or any other device capable of receiving and displaying notifications. The user device 120 may be configured to, for example, display results of observation identification and risk assessment received from the observation identification system 130.

The observation identification system 130 is at least configured to identify observations based on visual media content showing a construction site in accordance with the disclosed embodiments. The observation identification system 130 may be further configured to determine risks as described herein.

The databases 140 store at least the visual media content showing the construction site. The visual media content may include, but is not limited to, images, video, both, and the like. The databases 140 may further store historical risk assessment data, known issue data, insurance claim and loss data, site plans, combinations thereof, and the like. In this regard, it is noted that claim and loss data is typically maintained confidential such that different construction companies should not have access to each other's claim/loss data. To this end, the insurance claim and loss data may be stored differently for different construction performing entities (e.g., different construction companies), and only claim/loss data related to a particular client are obtained when determining likelihood and severity of observations for that client. In an example implementation, the observation identification system 130 is configured to retrieve any or all of the aforementioned data from the databases 140.

The regulatory authority data sources 150 may include, but are not limited to, databases, servers, or other systems operated by regulatory authorities and storing data including indications of known issues. In another example implementation, the observation identification system 130 is configured to retrieve known issue data from the regulatory authority data sources 150 instead of from the databases 140. In yet another example implementation, the observation identification system 130 may be configured to retrieve known issue data from both the databases 140 and the regulatory data authority sources 150.

In an embodiment, the known issue data may be retrieved from the regulatory authority data sources 150 as needed when observations are to be identified. Retrieving the known issue data as needed allows for identifying observations related to new and emerging issues, particularly as regulatory requirements for construction sites change over time. This, in turn, allows for more accurately identifying current issues.

It should be noted that a particular network configuration is shown in FIG. 1, but that the disclosed embodiments may be equally applied to other network configurations without departing from the scope of the disclosure.

Figure 2:
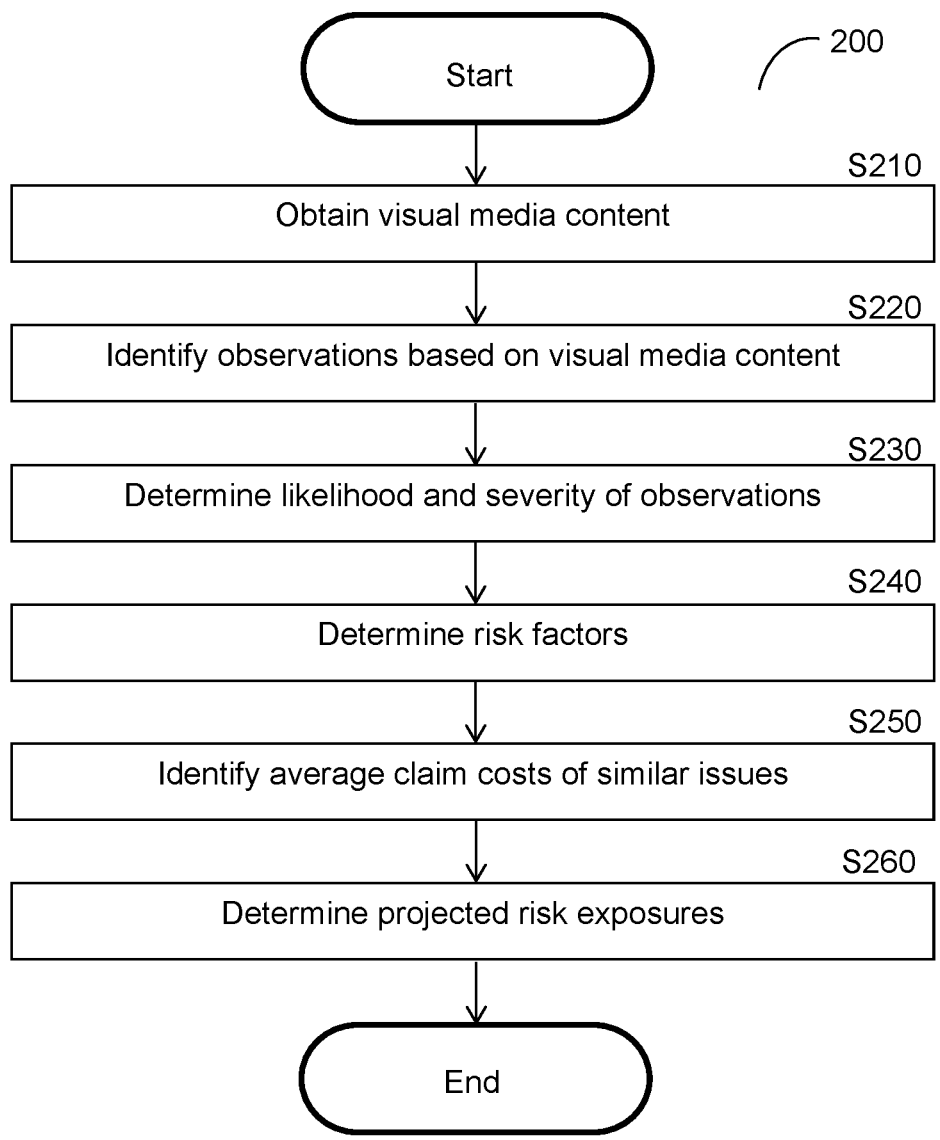
FIG. 2 is a flowchart illustrating a method for risk assessment based on safety observations related to a construction site according to an embodiment.

FIG. 2 is a flowchart 200 illustrating a method for risk assessment based on observations related to a construction site according to an embodiment. In an embodiment, the method is performed by the observation identification system 130, FIG. 1.

At S210, visual media content is obtained. The visual media content may include, but is not limited to, images, video, or both. The visual media content may be included in multimedia content. To this end, in some implementations, the multimedia content including the visual media content is obtained. The visual media content shows a construction site such as, for example, a construction site in progress, a completed construction site, and the like. In an embodiment, S210 includes receiving or retrieving the visual media content from one or more databases (e.g., the databases 140, FIG. 1).

At S220, based on the visual media content, safety observations are identified. In an embodiment, S220 includes at least identifying items related to safety observations and determining, based on the identified items, whether each item reflects a safety observation and how the item reflects a safety observation (e.g., on its own or based on a relationship to another identified item).

The items are visually identified in the visual media content and may include, but are not limited to, people, personal safety equipment (e.g., helmets, vests, harnesses, etc.), floors, construction materials (e.g., paint cans, boards, bolts, waterproofing materials, etc.), other safety equipment (e.g., ladders, fire extinguishers, netting, window covers, etc.) animals, combinations thereof, and the like. The visually identified items may further be identified with respect to a condition of each item. Such conditions may include, but are not limited to, wearing or not wearing specific personal safety equipment (e.g., wearing or not wearing a high visibility vest), complete or incomplete (e.g., missing additional items, incomplete connections or finishes, etc.), combinations thereof, and the like.

The safety observations may be determined based on the identified items, for example, based on appearance of an item having a particular condition or based on a spatial relationship between two particular items. The safety observations may also be determined based on absence of expected items (e.g., items that are not present at the construction site or items which do not appear within a threshold distance of particular other items) as defined in predetermined required item rules. As a non-limiting example, such required item rules may require that a fire extinguisher exist within 75 feet of any point on the construction site and that at least one fire extinguisher exist within 5 feet of a staircase on each floor.

The safety observations relate to safety issues such as, but not limited to, insufficient number of fire extinguishers on site, (e.g., no fire extinguishers within 75 feet from a point on the site plan of the construction site, less than one extinguisher per 1500 ft², less than one extinguisher next to each staircase, both, etc.), missing toe board, incomplete netting, lack of compliance with employee safety policies (e.g., employees not wearing high visibility safety vests), combinations thereof, and the like.

In a further embodiment, the items are visually identified using a machine learning model trained to classify items relevant to safety observations as described further below with respect to FIG. 3. Alternatively or collectively, the items may be visually identified based on comparison to predetermined images of known items that are relevant to safety observations.

Figure 3:
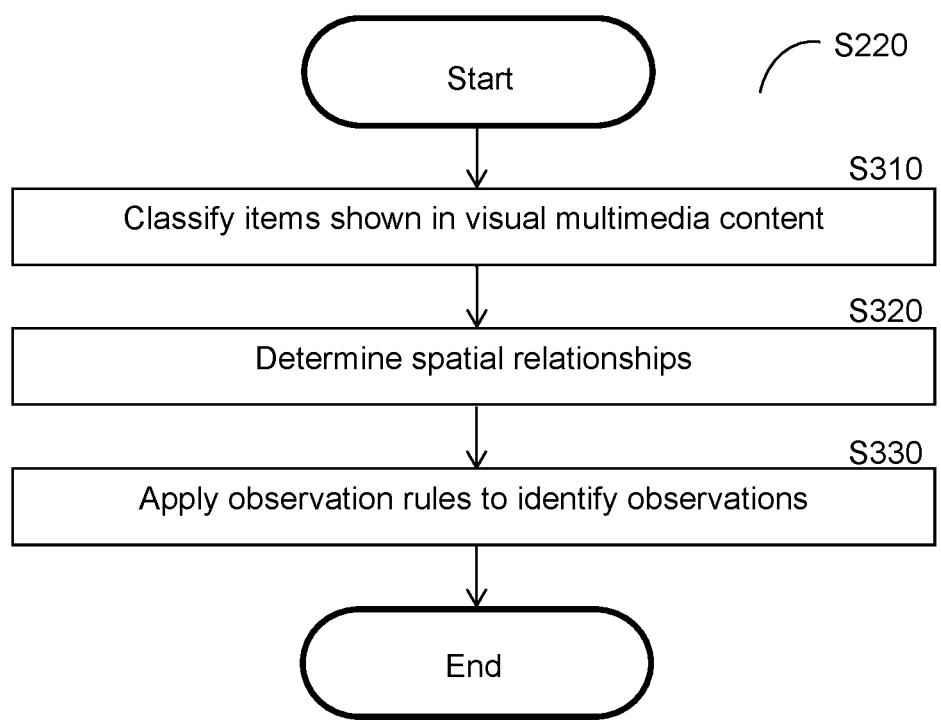
FIG. 3 is a flowchart illustrating a method for identifying observations in visual media content of a construction site using machine learning according to an embodiment.

FIG. 3 is a flowchart S220 illustrating a method for identifying observations in visual media content of a construction site using machine learning according to an embodiment.

At S310, the visual media content is input to a classifier. The classifier is a machine learning model trained to classify items shown in visual content. More specifically, the classifier is trained to classify items into one of several types of relevant observations. For safety observations, potential classifications for objects shown in visual media content may include, but are not limited to, fire extinguishers, toe boards, netting, employee safety equipment (e.g., high visibility vests, helmets, face shields, masks, etc.), irrelevant to safety, combinations thereof, and the like.

In an embodiment, the classifier may be further trained to detect the items shown in the visual content and to classify the detected items. To this end, in a further embodiment, the classifier may be further trained to detect portions of the images representing discrete items (e.g., by drawing boundary boxes around such portions) and to classify each discrete item. Alternatively, the classifier may be trained to detect items shown in images which already have discrete items identified (e.g., via bounding boxes).

In an embodiment, the classifier is trained via supervised machine learning based on labeled training data including training visual media content and labels indicating classifications of items shown in the visual media content. The classifier is trained to utilize visual media content as inputs and to output classifications for items shown in the visual media content.

In other embodiments, the classifier may be trained unsupervised learning, semi-supervised learning, or deep learning. In such an embodiment, the classifier may be trained to classify items with respect to, for example, risk. As a non-limiting example, based on training visual content and training risk exposures, the classifier is trained to classify items shown in visual content with respect to risk severity. As another non-limiting example, based on training visual content and training results of natural language processing determined based on text provided by users (e.g., text indicating types of items that affect risk exposure as shown in the training visual content), the classifier may be trained to classify the items shown in visual content.

In an embodiment, the classifier may be further trained to output a confidence score for each pair of identified items shown in different portions of the visual media content. In other words, each item shown in each portion of visual media content may be compared to each other item shown in other portions of the visual media content, and a confidence score representing a degree of confidence that the compared items are the same item is output by the classifier for each pair of compared items. The confidence score may therefore be utilized to determine whether potential observations are redundant insofar as they show the same item with the same issue in different portions of the construction site.

To this end, the classifier may include a probabilistic model and is trained based further on training tracking data for items moving around historical construction sites. As a non-limiting example, a person may be shown moving around the construction site in 20 images showing the person from different angles, under different lighting, and the like. Accordingly, when such images are input to the classifier, the classifier outputs a classification such as "Person A" for the person with a high confidence score for each pair of images showing the person.

In this regard, it is noted that visual content of a site may show the same item moving throughout a construction site. Failing to recognize that items which may appear different are actually the same item in different positions and orientations will result in inaccurately identifying issues related to these items as separate issues, thereby resulting in inaccurate observations in the form of false positives (i.e., redundant instances of the same observation). For example, a worker that is not wearing a high visibility safety vest as shown in multiple images may be identified as multiple observations. This, in turn, will decrease accuracy of subsequent processing (e.g., risk assessment). Accordingly, training the classifier to further output confidence scores representing the likelihood that items shown in different portions of visual media content are the same allows for more accurately determining observations and corresponding risk exposure.

At S320, spatial relationships between classified items are determined. In an embodiment, the spatial relationships are determined based on the visual media content, the classified items, and sensor data provided by sensors deployed at the construction site. In a further embodiment, the sensor data includes at least a time of capture, a location of the sensor at the time of capture, and content of sensor readings. The resulting spatial relationships may include, but are not limited to, distances between items.

In this regard, it has been identified that many issues on construction sites are defined based on proximity (or lack thereof) of items to each other such that identifying spatial relationships will, in turn, result in identifying more observations that are relevant to risk in construction projects generally and, in particular, to safety. Accordingly, determining spatial relationships as described above allows for more accurately identifying observations.

At S330, predetermined observation rules are applied to the classified items and their spatial relationships in order to identify observations. The observation rules define known issues that may affect risk. For safety observations, the observation rules define safety hazards or other issues that increase the likelihood of harm to people or property. The observation rules may be based on, for example, codes published by regulatory authorities defining violations of regulatory requirements.

In an embodiment, one or more of the observation rules include definitions of violations based on identification of certain types of classified items regardless of spatial proximity to other specific items. As a non-limiting example, an employee failing to wear a hardhat on the construction site may be a safety violation as defined in OSHA regulatory codes. In a further embodiment, one or more of the observation rules include definitions of violations based on spatial proximity between specific types of items. As a non-limiting example, employees that are within 5 feet of a ledge without a guard rail may be a safety violation as defined in OSHA regulatory codes.

In another embodiment, the observation rules include ignoring observations related to the same item (e.g., an item shown in multiple portions of visual media content having a confidence score above a threshold) such that redundant observations are not identified. As a non-limiting example, when the same person is shown in multiple images as indicated by a confidence score of 80% for every set of two instances of the person and the person is shown as lacking a high visibility vest, only one observation based on these instances of the person is identified. By ignoring redundant observations, the identified observations are more accurate for risk assessment purposes. Further, since the ignoring of redundant observations is based on confidence scores which objectively indicate similarities between items in the visual content, the observed issues are more accurately identified.

It should be noted that FIG. 3 is described with respect to observations that may be affected by spatial relationships among items, but that the method of FIG. 3 may be equally applicable to observations that are not affected by spatial relationships. As an example, some progress observations may be affected by times of items shown in visual media content. In such embodiments, S320 may include determining temporal relationships between items shown in the visual media content based on time metadata associated with the visual media content (e.g., timestamps). Then, observation rules are applied to the classified items based on their temporal relationships.

Returning to FIG. 2, at S230, a likelihood and severity of each observation is determined. The likelihood and severity are impact parameters indicating a relative impact of each observation. In an embodiment, the likelihood and severity are determined based on recordables data, claim and loss data, or both. In a further embodiment, the likelihood and severity may be determined based further on external events such as, but not limited to, weather, natural disasters, both, and the like. The external events may be based on, for example, weather reports, sensor readings (e.g., sensor readings related to wind speed or other indicators of harsh weather), both, and the like.

Figure 4:
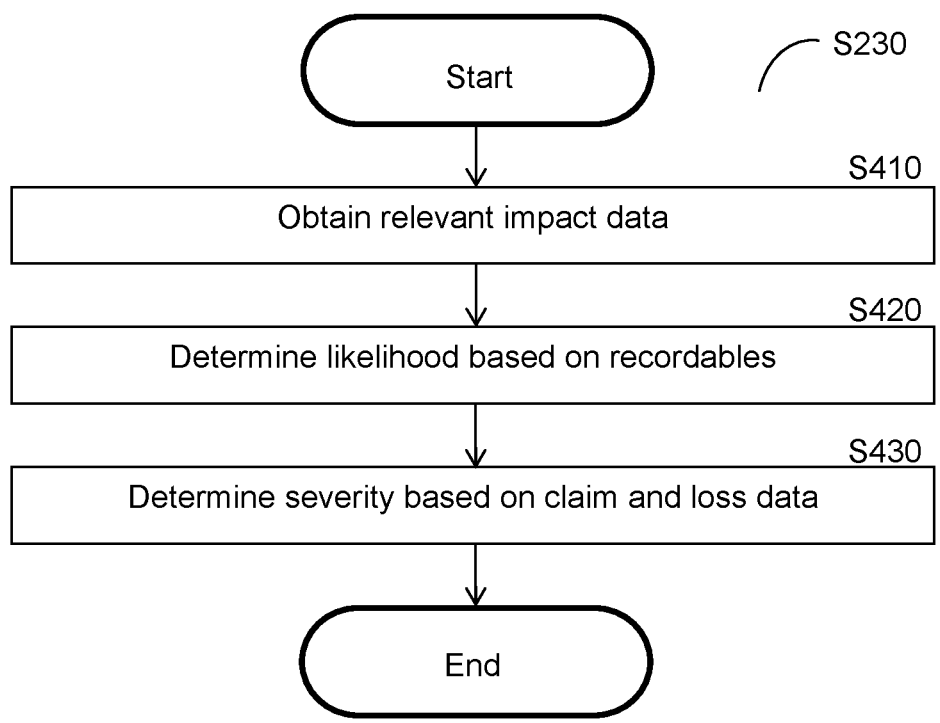
FIG. 4 is a flowchart illustrating a method for determining likelihood and severity of a safety observation according to an embodiment.

FIG. 4 is a flowchart S230 illustrating a method for determining likelihood and severity of a safety observation according to an embodiment.

At S410, relevant impact data is obtained for each observation. In an embodiment, the relevant impact data for a safety observation includes, but is not limited to, recordables data as well as claim and loss amounts. The recordables data is historical data of prior incidents such as violations or other issues published by regulatory or internal company authorities, and therefore may be relevant for determining the likelihood that a particular issue will result in a regulatory violation or accident. The claim and loss amounts include historical costs paid, for example, by insurance companies, in connection with previous issues and may therefore be utilized to provide an average cost for the same type of issues.

At S420, a likelihood of incident (e.g., a violation or accident) is determined based on a type of the observation and the recordables data. The type of the observation may be, for example, defined with respect to classification of items involved in the observed issue, any relationship between those items, both, and the like. In an embodiment, the likelihood is an impact parameter representing a probability that the observed issue will result in an accident or violation based on historical violations or accidents as indicated in the recordables data.

To this end, in an embodiment, S420 includes applying likelihood rules which may include, but are not limited to, determining a number of construction projects featuring historical violations or accidents with the same type of observed issue, determining a total number of construction projects, and determining a ratio of number of construction projects featuring historical incidents of the same type to a total number of construction projects in a given time period.

At S430, a severity is determined based on the type of the observation. In an embodiment, the severity is an impact parameter representing the degree of harm which could be caused by the observed issue, for example, as represented by an average cost indicated in historical claim and loss amounts for a given type of observed issue.

To this end, in an embodiment, S430 includes applying severity rules which may include, but are not limited to, identifying historical claim and loss amounts for the same type of observed issue, and determining the severity based on an average cost of the identified claim and loss amounts. The severity may be a relative number, for example a value on a scale (e.g., a scale from 1 to 10), a value in one or more buckets (e.g., high, medium, low), and the like. The rules for determining the relativity of the severity are predetermined.

In a further embodiment, the relevant claim and loss data is obtained from a data source dedicated to a particular construction-performing entity (e.g., to a particular construction company that is working on the construction site). As noted above, claim/loss data is often entity-specific and kept confidential from other entities. Accordingly, to increase security by preventing exposure of claim/loss data between entities, only claim/loss data related to the entity working on the construction site shown in the visual media content is obtained.

By determining likelihood and severity of observations based on relevant historical impact data related to historical incidents rather than a perceived impact that is subjective among persons, the resulting risk assessment is consistently more accurate than risk assessments made manually.

Returning to FIG. 2, at S240, one or more risk factors are determined for each observation based on the likelihood and severity determined for the observation. In an embodiment, the risk factor may be determined based on an intersection between the likelihood and severity. To this end, in an embodiment, S240 further includes determining the risk factor using an equation having the likelihood and severity as variables. Different risk factors may be determined for different types of risk (e.g., risk of property damage, risk of harm to persons, risk of specific types of property damage or harm to persons, etc.).

At S250, an average claim cost of similar issues is identified for each observation. In an embodiment, an issue is similar when it is related to the same type of observation. As non-limiting examples, a type of observation may be "construction worker not wearing a high visibility vest," "fire extinguisher not near staircase on this floor," or "worker too close to edge of platform without guard rail." The average claim cost may be determined based on historical claim and loss data for historical incidents caused by similar issues as to the issues reflected in the visual media content.

At S260, a projected risk exposure is determined for each observation. In an embodiment, the projected risk exposure for each observation is determined based on the risk factors for that observation. In a further embodiment, the projected risk exposure for an observation may be a sum of risk exposures, where each summed risk exposure is determined based on a respective risk factor for the observation.

In an embodiment, the projected risk exposure is a financial risk, and the projected risk exposure for each observation is determined based on the severity of the observed issue and an average claim cost for similar issues (e.g., issues of historical observations of the same type having a similar severity, for example, having a severity score within a threshold). To this end, in an embodiment, S260 includes determining a projected cost for each observation.

In an embodiment, the projected cost for each observation depends on whether the observation is related to the critical path. More specifically, when an observation is related to the critical path of the schedule, the cost is determined based on a database of average insurance claim costs associated with different types of issues. Such a database may indicate the average claim costs of correcting the observed issue, for example additional costs of rush work to correct the issue or costs caused by delays. To this end, in such an embodiment, S260 includes identifying a similar issue indicated in the database based on a type, the likelihood, and the severity of the observed issue.

When an observation is not related to the critical path, tasks may be shifted to accommodate resulting changes to the schedule such that the projected cost for the observation includes only costs associated with shifting of tasks.

It should be noted that FIG. 2 is described with respect to risk assessment via determining risk exposure, but the projected costs determined at S260 may be utilized for other purposes. As a non-limiting example, the projected costs may be utilized to update an expected budget needed for a given month and determine whether the additional funds required exceeds a permissible threshold. Based on these costs and the amount by which they exceed budgetary constraints, a likelihood that the observed issues will cause funds to run out before completion of the project may be determined.

It should also be noted that FIG. 2 is specifically focused on identifying and utilizing safety observations, but that the disclosed embodiments may be equally applicable to identifying and utilizing other types of observations. Such other types of observations may include, but are not limited to, quality, progress, and budget. In this regard, it has been identified that issues related to safety, quality, progress, and budget can all affect the risk exposure for a given construction project.

To this end, it should be noted that the method of FIG. 2 may be adjusted for quality observations instead of safety observations. More specifically, the identified observations may include predetermined or learned quality observations such as, but not limited to, insufficient weather protection (e.g., missing window covers, flashing, sealing of roof levels, lack of roof drainage, etc.), improper falsework and shoring (e.g., missing or bent members, incomplete connections, plumb shoring, etc.), and failure to meet bolting or fit-up requirements (e.g., less than 4 bolts at column base plates, less than 2 bolts at beam connections prior to releasing lifting lines, etc.), combinations thereof, and the like. Like for safety, a likelihood and severity of each quality observation may be determined. Any projected costs for risk assessment of quality observations may be based on damage to property, people, regulatory penalties (e.g., fines), or combinations thereof.

Figure 5:
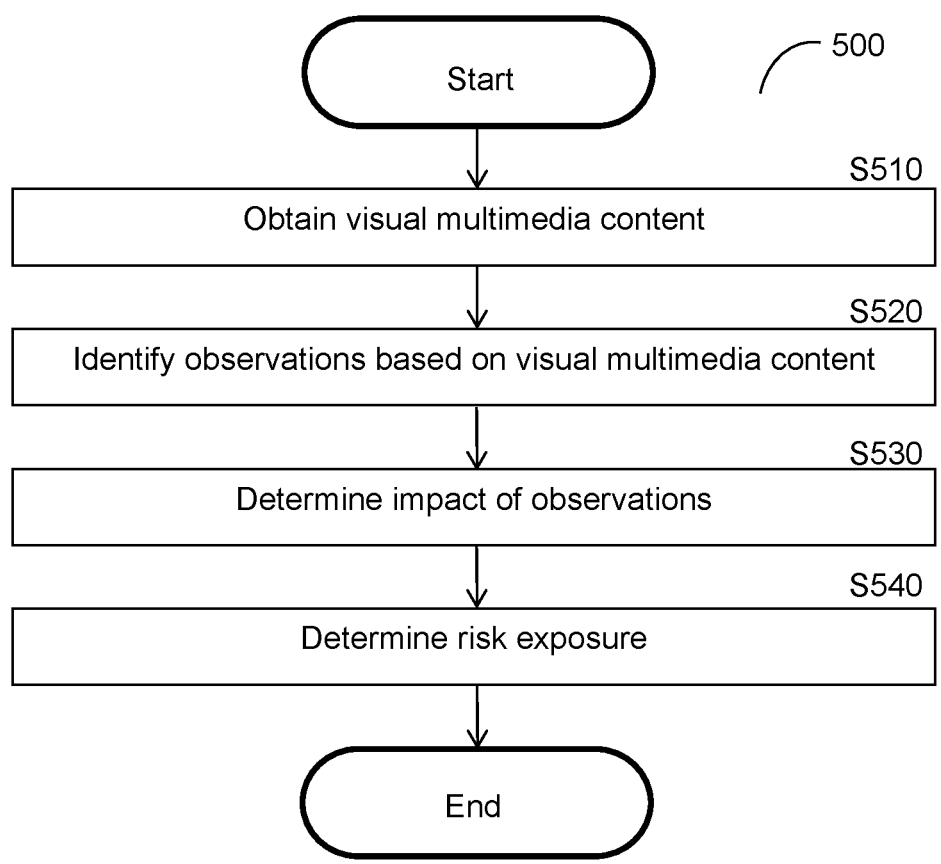
FIG. 5 is a flowchart illustrating a method for risk assessment based on observations related to a construction site according to an embodiment.

A method for determining risk exposure based on observations that may be generally applicable to different types of observations is now described with respect to FIG. 5.

FIG. 5 is a flowchart 500 illustrating a method for determining risk exposure according to another embodiment. In an embodiment, the method is performed by the observation identification system 130, FIG. 1.

At S510, visual media content showing a construction site is obtained. The visual media content may include, but is not limited to, images, video, or both. The visual media content shows a construction site. In an embodiment, S510 includes receiving or retrieving the visual media content from one or more databases (e.g., the databases 140, FIG. 1).

In an embodiment, S510 may further include obtaining other data used for identifying observations, impacts, and projected costs. Such data may include, but is not limited to, a site plan (e.g., an architectural, engineering, or three-dimensional floor plan model), a schedule for a construction project involving the construction site, a two week look-ahead describing upcoming tasks for a construction project given a current progress of the project, safety plans, permits, trade data, labor hours data, size of a construction site (e.g., an area as expressed in square feet or square meters), monthly budgets, combinations thereof, and the like.

In another embodiment, S510 may further include retrieving regulatory data (e.g., from the regulatory authority data sources 150, FIG. 1). Such regulatory data may include, but is not limited to, recordable sets, code, both, and the like. The regulatory data is published by one or more regulatory authorities such as, but not limited to, the Occupational Safety and Health Administration (OSHA).

The recordable sets include historical data related to results of issues which are typically recorded as a matter of course by regulatory authorities. Non-limiting examples of recordable sets may include, but are not limited to, fatality inspection data, establishment inspection data, establishment violation data, accident data, combinations thereof, and the like.

The codes include requirements for buildings that are punishable, for example, by fine. Non-limiting example codes may include, but are not limited to, Fire Protection and Protection codes (e.g., OSHA 1926.150 Subpart F), Electrical codes (e.g., OSHA 1926.404 Subpart K), Concrete and Masonry Construction codes (e.g., OSHA 1926.704 Subpart Q), combinations thereof, and the like.

At S520, observations are identified based on the visual media content. The observations to be identified may be predetermined or learned via machine learning, and may differ depending on the type of observation being analyzed. Examples of different types of observations include safety and quality observations as described above as well as progress and budget observations as described below.

In an optional embodiment, in addition to identifying observations related to issues which are visible in the visual media content, S520 may further include identifying observations related to external events, i.e., events which are not visually represented in the visual media content but which may affect the construction project. Such external events may include, but are not limited to, weather, natural disasters, viruses (e.g., the influenza virus or the Novel Coronavirus), deaths occurring on the construction site, lack of government permits, lack of worker certifications, combinations thereof, and the like. As a non-limiting example, weather may interfere with construction such that progress on the construction site will be affected depending on the current state of the construction site reflected in the visual media content.

Predetermined rules for effects of external events on a construction schedule may be utilized to determine which external events are identified as observations. More specifically, the rules define what potential effect each external event might have on any affected tasks, and the potential effects of the external events for the current construction site are utilized to determine whether any tasks in the schedule of the current construction site will be affected. As a non-limiting example, when upcoming weather reports indicate that rain is predicted on a given day and that the schedule indicates a task of pouring concrete on that day, the task of pouring concrete will need to be delayed.

In an embodiment, external events may be checked for periodically or when a change in expected external events occurs. This allows, for example, identifying new observations which may cause delays in the schedule as external events change. As a particular example, weather predictions may change as a given date approaches such that predicted weather which originally was not expected to affect the tasks of the schedule may change to a prediction of weather that will interfere with one or more tasks when the planned date for performing that task approaches.

At S530, an impact is determined for each of the identified observations. Determining the impact includes determining one or more impact parameters for each observation. The impact parameters may include, but are not limited to, likelihood and severity (e.g., for safety and quality issues), time and cost (e.g., for progress issues), and the like.

At S540, a risk exposure is determined for each observation based on the respective impact. In some embodiments, the risk exposure is a projected cost which represents an average cost of failure to address observed issues. In other implementations, the risk exposure may be a percentage or other value representing the probability that an observed issue will cause failure of the construction project in one or more ways (e.g., failure to adhere to a budget).

The general method as described with respect to FIG. 5 may be adjusted to accommodate different types of observations. Further, the method as described with respect to FIG. 5 may include identifying multiple types of observations and determining respective impact parameters and risk exposure for each.

As a non-limiting example for adjusting the method of FIG. 5 to accommodate different types of observations, the observations may include progress observations related to issues which could delay or otherwise affect progress on the construction site. Such progress observations may include, but are not limited to, delivery of waterproofing materials (or lack thereof), scheduled activities being conducted (e.g., hanging and finishing board walls, finishing ceilings, installing ceiling grids, etc.), both, and the like.

Progress of the construction site is determined based on the visual media content and a schedule for a construction project of the construction site. The progress may be determined with respect to various tasks in the schedule. To this end, determining the progress may include determining times of the progress observations based on timestamps of the visual media content. The progress may be determined based further on a site plan such as, for example, a geo-localized enhanced floor plan created as described in U.S. patent application Ser. No. 16/220,709, assigned to the common assignee, the contents of which are hereby incorporated by reference. Using such a geo-localized enhanced floor plan allows for considering three-dimensional features of the site when determining site plan progress, thereby improving accuracy of the progress determination.

It is determined whether each observation relates to a critical path of the schedule. The critical path of the schedule includes necessary tasks for completing the construction site project that cannot proceed until particular other tasks are completed such that an observed issue related to the critical path must be addressed before other tasks of the schedule can proceed.

A risk exposure is determined based on the impact parameters, the determined progress of the construction site, and whether or not each observed issue affects the critical path of the schedule. The risk exposure for progress observations may be a cost of correcting the issue such that the progress of the construction site is not delayed. When the observed issue is related to the critical path, the risk exposure may be determined based on a database of predetermined correction costs for respective known progress-delaying issues. When the observed issue is not related to the critical path, impact parameters including time and cost of shifting tasks may be determined, and the risk exposure may be determined based on those impact parameters as well as respective probabilities for each of the impact parameters.

As another non-limiting example for adjusting the method of FIG. 5 to accommodate different types of observations, the observations may include budget observations related to issues which could alter the funds needed to complete the construction project. In this regard, it is noted that budgets for construction projects may be adjusted periodically and that, if the gap between the budget and the projected costs for a given month exceeds a threshold, urgent cost saving measures may need to be taken, the project may need to be scrapped entirely, or additional funds may need to be raised in order to complete the project. To this end, the observed issues may include budgetary issues which reflect portions of the construction site that are more expensive than originally planned, and the impact parameters may include excess costs of these more expensive items. The risk exposure determined based on these impact parameters may be a likelihood that the construction project will exceed the allowed budget.

Figure 6:
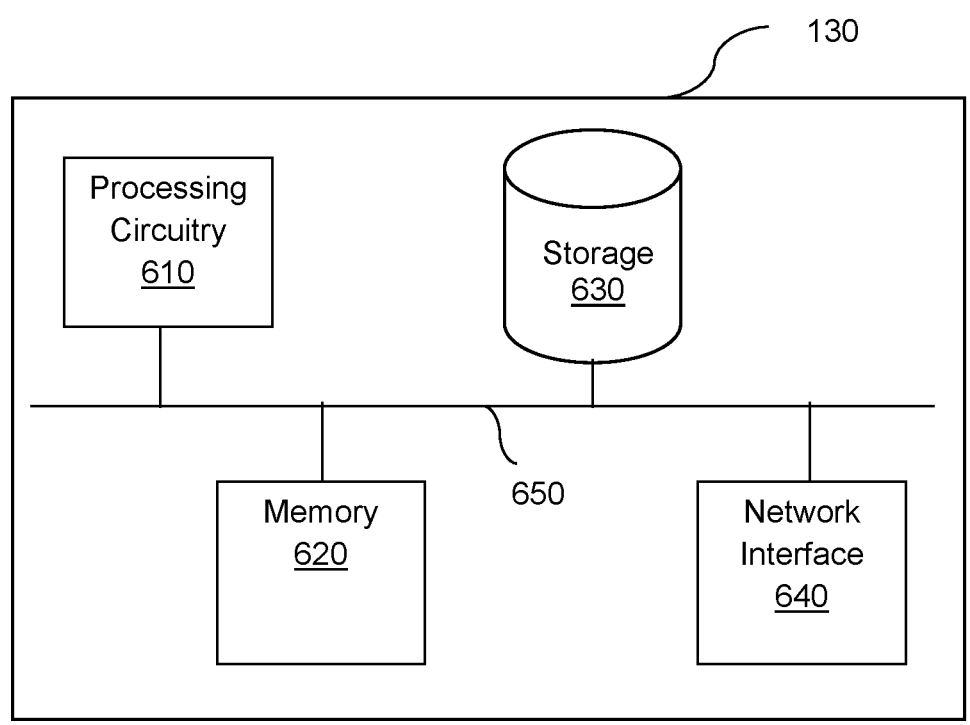
FIG. 6 is a schematic diagram of observation identification system according to an embodiment.

FIG. 6 is an example schematic diagram of an observation identification system 130 according to an embodiment. The observation identification system 130 includes a processing circuitry 610 coupled to a memory 620, a storage 630, and a network interface 640. In an embodiment, the components of the observation identification system 130 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read only memory, flash memory, etc.), or a combination thereof.

In one configuration, software for implementing one or more embodiments disclosed herein may be stored in the storage 630. In another configuration, the memory 620 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 640 allows the observation identification system 130 to communicate with the databases 140 for the purpose of retrieving visual media content, historical risk assessment data, known issue data, insurance claim and loss data, combinations thereof, and the like. The network interface 640 may further allow the observation identification system 130 to communicate with the regulatory authority data sources 150 for the purpose of retrieving, for example, known regulatory issues. Further, the network interface 640 allows the observation identification system 130 to communicate with the user device 120 for providing identified observations, risk assessments, both, and the like.

It should be understood that the embodiments described herein are not limited to the specific architecture illustrated in FIG. 6, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for determining impact parameters for observations identified in visual media content, comprising:
   identifying a plurality of observations in visual media content, wherein identifying the plurality of observations further comprises identifying a plurality of items shown in the visual media content, wherein each identified observation corresponds to at least one item of the identified plurality of items, wherein each observation corresponds to a respective incident type;
   determining a likelihood impact parameter for each of the plurality of observations, wherein determining the likelihood impact parameter for each observation further comprises applying likelihood rules based on a classification of each of the corresponding at least one item and a ratio of historical incidents of a same incident type as the observation to a total number of projects in a time period;
   determining a severity impact parameter for each of the plurality of observations, wherein determining the severity impact parameter for each observation further comprises applying severity rules based on an average cost of the historical incidents of the same incident type as the observation; and
   determining at least one risk factor for each of the plurality of observations based on the likelihood and severity impact parameters determined for the observation.

2. The method of claim 1, wherein identifying the plurality of observations further comprises:
   applying a machine learning model to the visual media content in order to output a classification for each of the plurality of items, wherein the plurality of observations is identified based on the classifications.

3. The method of claim 2, wherein the machine learning model is further trained to detect a plurality of portions of the visual media content representing respective distinct items, wherein the plurality of items is the distinct items represented by the plurality of portions.

4. The method of claim 2, wherein the machine learning model is further trained to output a confidence score for each of a plurality of pairs of items, wherein each of the plurality of pairs of items includes two items of the identified plurality of items shown in different portions of the visual media content, wherein the plurality of observations is determined based further on the confidence scores.

5. The method of claim 4, wherein the confidence score for each pair of items represents a degree of confidence that the items of the pair of items are redundant.

6. The method of claim 5, wherein one item of each pair of items having a confidence score above a threshold is ignored when identifying the plurality of observations.

7. The method of claim 1, wherein identifying the plurality of observations further comprises:
determining spatial relationships between items of the identified plurality of items, wherein the plurality of observations is identified based further on the determined spatial relationships.

8. The method of claim 1, wherein the plurality of observations includes a plurality of safety observations, wherein the plurality of safety observations includes at least one of: insufficient number of fire extinguishers on a site, a missing toe board, incomplete netting, and lack of compliance with safety policies.

9. The method of claim 1, wherein the plurality of observations includes a plurality of quality observations, wherein the plurality of quality observations includes at least one of: insufficient weather protection, improper falsework and shoring, failure to meet bolting requirements, and failure to meet fitting requirements.

10. A non-transitory computer readable medium having stored thereon instructions for causing a processing circuitry to execute a process, the process comprising:
identifying a plurality of observations in visual media content, wherein identifying the plurality of observations further comprises identifying a plurality of items shown in the visual media content, wherein each identified observation corresponds to at least one item of the identified plurality of items, wherein each observation corresponds to a respective incident type;
determining a likelihood impact parameter for each of the plurality of observations, wherein determining the likelihood impact parameter for each observation further comprises applying likelihood rules based on a classification of each of the corresponding at least one item and a ratio of historical incidents of a same incident type as the observation to a total number of projects in a time period;
determining a severity impact parameter for each of the plurality of observations, wherein determining the severity impact parameter for each observation further comprises applying severity rules based on an average cost of the historical incidents of the same incident type as the observation; and
determining at least one risk factor for each of the plurality of observations based on the likelihood and severity impact parameters determined for the observation.

11. A system for identifying observations using images of a construction site, comprising:
a processing circuitry; and
a memory, the memory containing instructions that, when executed by the processing circuitry, configure the system to:
identify a plurality of observations in visual media content, wherein identifying the plurality of observations further comprises identifying a plurality of items shown in the visual media content, wherein each identified observation corresponds to at least one item of the identified plurality of items, wherein each observation corresponds to a respective incident type;
determine a likelihood impact parameter for each of the plurality of observations, wherein determining the likelihood impact parameter for each observation further comprises applying likelihood rules based on a classification of each of the corresponding at least one item and a ratio of historical incidents of a same incident type as the observation to a total number of projects in a time period;
determine a severity impact parameter for each of the plurality of observations, wherein determining the severity impact parameter for each observation further comprises applying severity rules based on an average cost of the historical incidents of the same incident type as the observation; and
determine at least one risk factor for each of the plurality of observations based on the likelihood and severity impact parameters determined for the observation.

12. The system of claim 11, wherein the system is further configured to:
apply a machine learning model to the visual media content in order to output a classification for each of the plurality of items, wherein the plurality of observations is identified based on the classifications.

13. The system of claim 12, wherein the machine learning model is further trained to detect a plurality of portions of the visual media content representing respective distinct items, wherein the plurality of items is the distinct items represented by the plurality of portions.

14. The system of claim 12, wherein the machine learning model is further trained to output a confidence score for each of a plurality of pairs of items, wherein each of the plurality of pairs of items includes two items of the identified plurality of items shown in different portions of the visual media content, wherein the plurality of observations is determined based further on the confidence scores.

15. The system of claim 14, wherein the confidence score for each pair of items represents a degree of confidence that the items of the pair of items are redundant.

16. The system of claim 15, wherein one item of each pair of items having a confidence score above a threshold is ignored when identifying the plurality of observations.

17. The system of claim 11, wherein the system is further configured to:
determine spatial relationships between items of the identified plurality of items, wherein the plurality of observations is identified based further on the determined spatial relationships.

18. The system of claim 11, wherein the plurality of observations includes a plurality of safety observations, wherein the plurality of safety observations includes at least one of: insufficient number of fire extinguishers on a site, a missing toe board, incomplete netting, and lack of compliance with safety policies.

19. The system of claim 11, wherein the plurality of observations includes a plurality of quality observations, wherein the plurality of quality observations includes at least one of: insufficient weather protection, improper falsework and shoring, failure to meet bolting requirements, and failure to meet fitting requirements.

* * * * *